(12) United States Patent
Bannier et al.

(10) Patent No.: US 8,042,423 B2
(45) Date of Patent: Oct. 25, 2011

(54) BACKLASH-COMPENSATING GEAR TRAIN FOR HOROLOGICAL MECHANISM

(75) Inventors: Sebastien Bannier, Sonvilier (CH); David Passannante, Fribourg (CH); Nicolas Bonvin, Vernier (CH)

(73) Assignee: Rolex S.A., Geneva (CH)

( * ) Notice: Subject to any disclaimer, the term of this patent is extended or adjusted under 35 U.S.C. 154(b) by 173 days.

(21) Appl. No.: 12/423,903

(22) Filed: Apr. 15, 2009

(65) Prior Publication Data

US 2009/0260470 A1    Oct. 22, 2009

(30) Foreign Application Priority Data

Apr. 21, 2008    (EP) .................................. 08405111

(51) Int. Cl.
*F16H 55/14*    (2006.01)
(52) U.S. Cl. ........................................................ 74/461
(58) Field of Classification Search ............. 74/411, 74/461, 462; 368/76, 232, 322, 323
See application file for complete search history.

(56) References Cited

U.S. PATENT DOCUMENTS

| 2,335,504 | A | * | 11/1943 | Gazda | 74/462 |
| 3,636,792 | A | * | 1/1972 | Vigh | 74/461 |
| 4,127,041 | A | * | 11/1978 | Imazaike | 74/411 |
| 7,258,037 | B2 | * | 8/2007 | Wiederrecht | 74/461 |
| 2006/0048596 | A1 | | 3/2006 | Wiederrecht | |
| 2007/0180943 | A1 | * | 8/2007 | Daout | 74/457 |

FOREIGN PATENT DOCUMENTS

| EP | 1555584 A1 | 7/2005 |
| EP | 1520123 B1 | 7/2007 |
| GB | 160277 | 3/1921 |
| GB | 160277 A | 3/1921 |
| JP | 58-050357 | 3/1983 |

OTHER PUBLICATIONS

European Search Report 08 40 5111, Dated Dec. 11, 2008.
Harry Winston Excenter Timezone, in "Annee Horlogere Suisse," 2004, cited in related European application No. 08405111.9, w/ English translation.
Definition: Mouvement et translation, in C.-A. Reymondin et al., "Theorie d'horlogerie," Ed. Federation des Ecoles Techniques, p. 235, 2005, cited in related European application No. 08405111.9, w/ English translation.
Mobile de Minuterie du Calibre AGH2821, dated Oct. 14, 2009, presented as equivalent to gear of Harry Winston Excenter Timezone, cited in related European application No. 08405111.9, w/ English translation.

* cited by examiner

*Primary Examiner* — Vicky Johnson
(74) *Attorney, Agent, or Firm* — Westerman, Hattori, Daniels & Adrian, LLP

(57) ABSTRACT

At least some of the uniformly distributed teeth of one of the antibacklash partner toothed wheel units, of this backlash-compensating gear train for a horological mechanism, have elastic parts ($D_R$) that are flexible in the direction of the respective thicknesses of the teeth. Some of the teeth are capable of temporarily transmitting a torque considerably greater than the normal drive torque. Two adjacent teeth ($D_1$, $D_2$) capable of temporarily transmitting a torque considerably greater than the normal drive torque each comprise one flank ($D_{1a}$, $D_{2a}$) integral with a more rigid part ($D_{12}$), and one flank ($D_{1b}$, $D_{2b}$) integral with a more flexible part ($D_{1R}$, $D_{2R}$), the two more rigid parts ($D_{12}$) of the two teeth ($D_1$, $D_2$) being adjacent.

9 Claims, 4 Drawing Sheets

BACKLASH-COMPENSATING GEAR TRAIN FOR HOROLOGICAL MECHANISM

The present invention relates to a backlash-compensating gear train for a horological mechanism, in which at least some of the uniformly distributed teeth of one of the antibacklash partner toothed wheel units have elastic parts that are flexible in the direction of the respective thicknesses of the teeth and in which some of the teeth are capable of temporarily transmitting a torque considerably greater than the normal drive torque.

To make antibacklash gear trains for horological mechanisms, at least some of each tooth of the antibacklash wheel is rendered elastic by a slot extending along the direction of the height of the tooth. This has the consequence of weakening the tooth. This weakening must not of course exceed the ability of the tooth to withstand the torque which it must transmit.

In the trains of timers, such as chronographs, chronographs with split time counters, or any other type of counter in which the hand or hands must be reset to zero at the end of the measured time interval, a peak torque that is much greater than the normal torque to be transmitted occurs when the hand is reset and reaches zero. Such a torque can impose problems from the point of view of the strength of the teeth at this location.

In more general terms, if a hand of a timer is to be held at zero without applying a frictional force to this wheel, its teeth must have no backlash, because such a wheel is not part of a driven train in the way that the going train between the barrel and the escapement is driven.

The object of the present invention is to solve, at least partly, this uniformity of the teeth for backlash-compensating gear trains for horological mechanisms, while keeping the desired antibacklash properties.

To this end, the subject of the present invention is a backlash-compensating gear train for a horological mechanism as claimed in claim 1.

The term "thickness" as used here of the teeth is that generally used in respect of the teeth of toothed wheels. It is specifically the dimension of the teeth measured along the pitch diameter of the toothed wheel.

The solution provided by the present invention locally increases the strength of the teeth at the location where the teeth are subject to a large increase in the torque to be transmitted, due for example to a sudden deceleration following the sudden stopping of the train when, in particular, the hand of a timer returns to zero. In this case the torque may increase locally by a factor of at least 100. The invention simultaneously enables the gear train backlash to be compensated for, even in that part or those parts where the teeth are reinforced.

The attached drawings illustrate schematically and by way of example an embodiment of the backlash-compensating gear train to which the invention relates.

Figure 1:
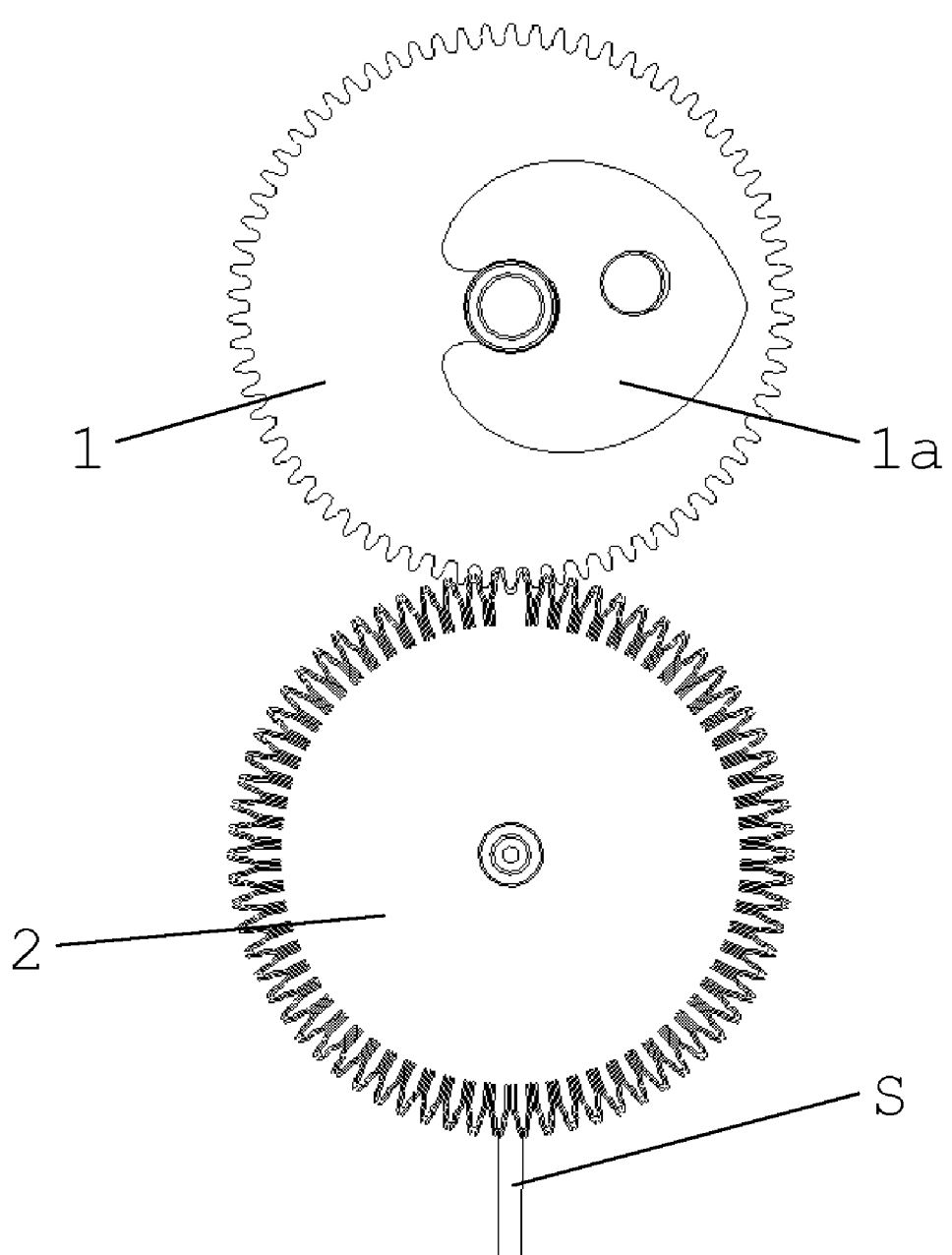
FIG. 1 is a plan view of a wheel train for a timer with resetting, with an antibacklash gear train according to the invention.

The timer wheel train illustrated in FIG. 1 comprises a drive wheel 1 with a resetting cam 1$a$. This wheel meshes with a seconds wheel 2 carrying a seconds hand S and having antibacklash teeth illustrated on a larger scale in FIG. 2 in particular. The rest of the timer mechanism is not necessary for an understanding of the invention: all that need be understood is what happens when the seconds hand S is reset by its resetting lever (not shown), also called the resetting hammer, which is a well-known part of chronograph mechanisms.

Unlike a seconds hand integral with the shaft of a seconds wheel forming part of the going train situated between the barrel and the escapement and therefore constantly being driven by the barrel spring, a timer wheel such as the seconds wheel 2 is free, which means that if the backlash of the teeth is not compensated for, the seconds hand S will tend to tremble slightly, making the quality of the timepiece appear to be poor. To prevent this happening, a small friction spring is generally fitted to such wheels. Such friction creates an artificial disturbance which causes a loss of energy, which in turn is synonymous with a loss of precision in the case of a timepiece.

New methods of manufacturing toothed wheels by LIGA (the acronym of the German Lithographie, Galvanoformung and Abformung) and electroforming, new machining methods such as those using masks and photopolymerizable resins and/or chemical machining processes, enable the manufacture of elastic teeth capable of compensating for the backlash in gear trains, rendering it unnecessary to use a friction spring.

In the case of resetting, the teeth located at the end of the travel when the backlash-compensating seconds wheel 2 is reset are subjected to a higher torque than the others because of the fierce deceleration due to the sudden stoppage of the wheel train.

The two conditions to be fulfilled simultaneously can be met by the two adjacent teeth $D_1$ and $D_2$ of the wheel 2. These teeth have the following feature: they each have a flank $D_{1a}$, $D_{2a}$, respectively, adjacent to the other tooth, and these flanks are formed on a solid part $D_{12}$ common to both teeth $D_1$, $D_2$.

The other flanks $D_{1b}$, $D_{2b}$ of the teeth $D_1$, $D_2$ are each formed on a leaf spring $D_{1R}$, $D_{2R}$, respectively, which have first of all a radial strip attached to the wheel, followed by the two flanks $D_{1b}$, $D_{2b}$ of the main teeth. As can be seen, the length of the flexible radial part $D_{1R}$, $D_{2R}$ of these strips is approximately equal to, or in this example greater than, the radial dimensions of the flanks corresponding to the height of the main teeth of the partner wheel (1), in order to improve the elasticity. The two rigid flanks $D_{1a}$, $D_{2a}$ and the two elastic flanks $D_{1b}$, $D_{2b}$ of the teeth $D_1$, $D_2$, respectively, are therefore separate from each other.

To maximize the thickness E of the reinforcing part $D_{12}$ common to the two teeth $D_1$, $D_2$, and therefore its ability to withstand the torque to be transmitted, the two slits separating this reinforcing part $D_{12}$ of each leaf spring $D_{1R}$, $D_{2R}$, respectively, begins in the center of the ends of the two teeth $D_1$, $D_2$, and the reinforcing part $D_{12}$ then expands symmetrically and the two side faces of the reinforcing part $D_{12}$ meet the solid part of the wheel. In this way the reinforcing part $D_{12}$, in which the width of the reinforced parts of the two adjacent teeth corresponds to more than two half-teeth, offers the best strength to withstand the torque which it has to withstand at the instant when the seconds hand S stops upon being reset.

The other teeth of the antibacklash wheel 2 are teeth formed by two leaf springs $D_R$ which are symmetrical, in this example, about a stronger central element $D_c$.

The two teeth $D_1$, $D_2$ of the antibacklash wheel 2 therefore fulfill both the need to increase locally the strength of the teeth and the need to retain the ability to compensate for the backlash at a particularly critical location.

Figure 2:
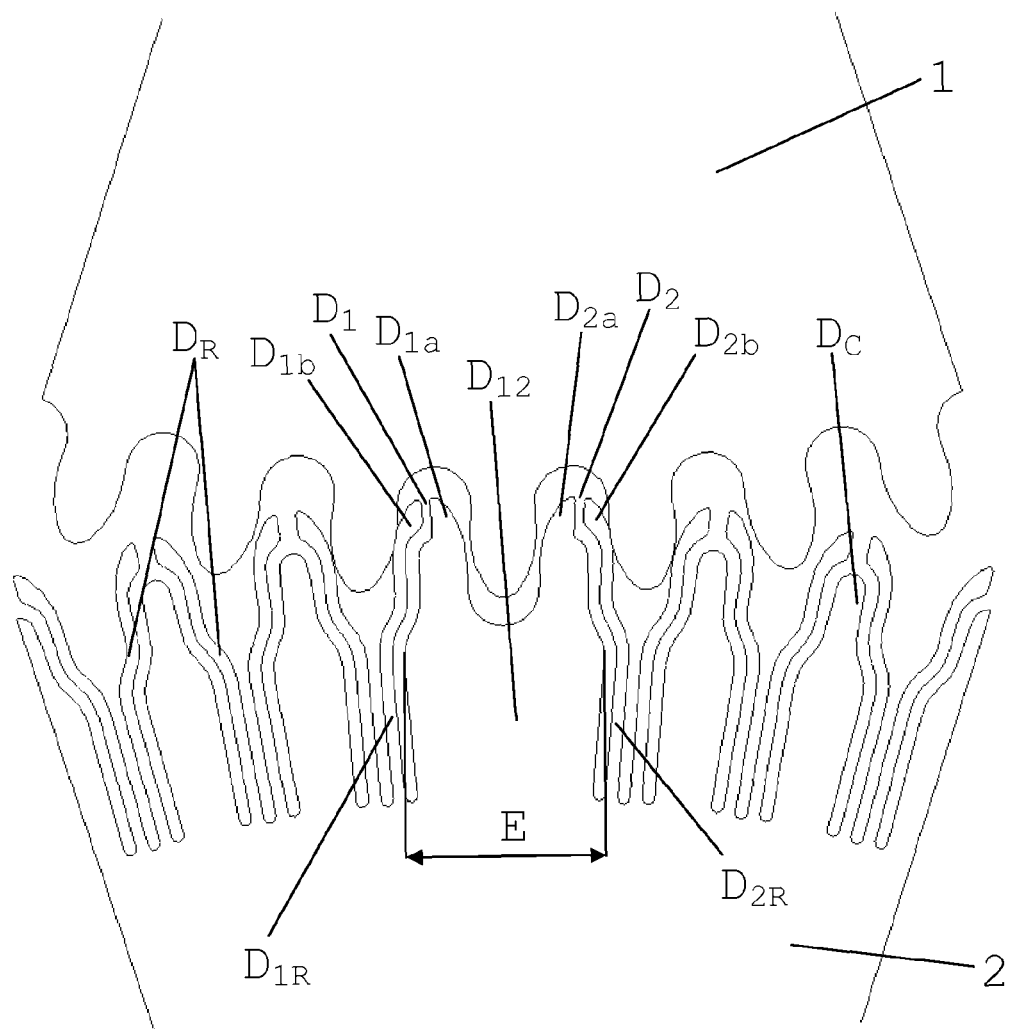
FIG. 2 is a partial enlarged plan view of the wheels seen in FIG. 1.
Figure 3:
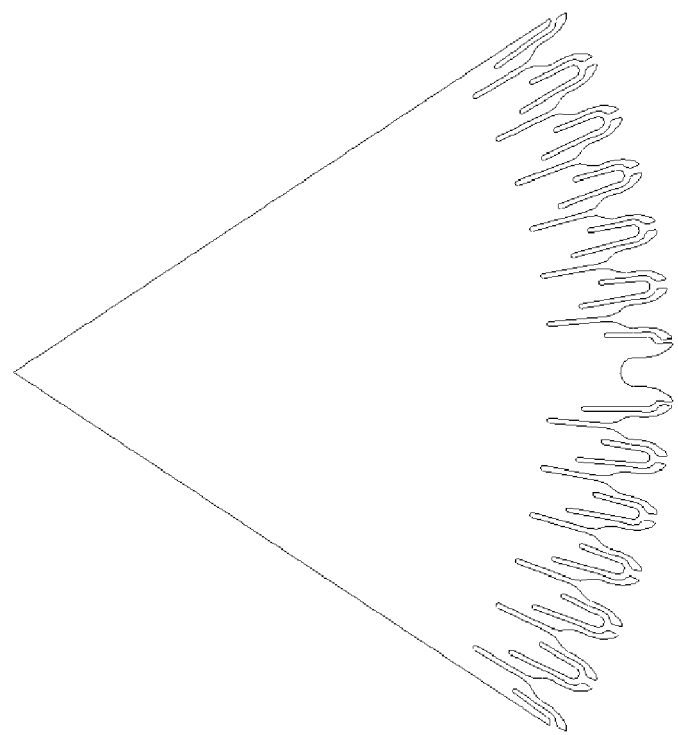
FIGS. 3-5 are partial plan views showing variants of the antibacklash wheels.
Figure 4:
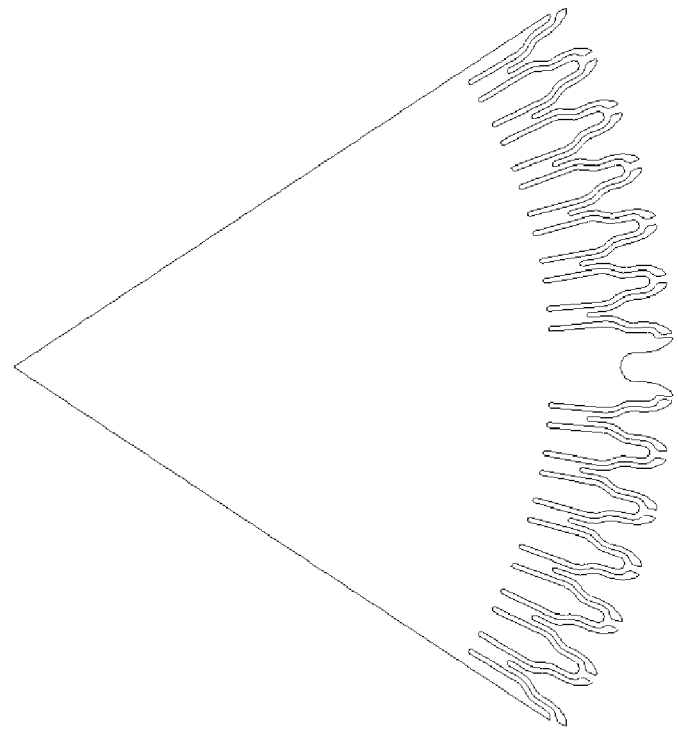
Figure 5:
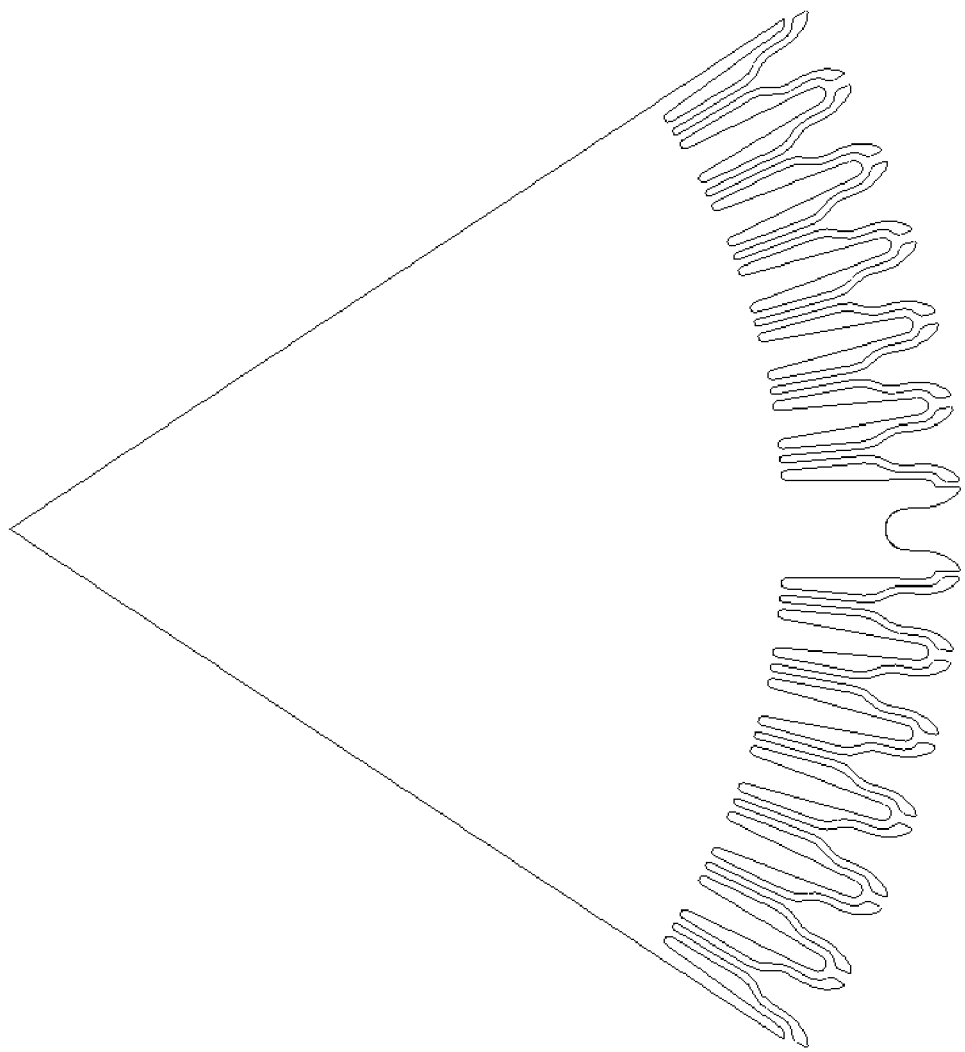

FIGS. 3-5 illustrate different variants of antibacklash wheels from FIGS. 1 and 2 with two reinforced teeth having features similar to those of the wheel seen in FIGS. 1 and 2. The teeth in FIG. 3 are asymmetrical. They are designed to be able to transmit more torque in one direction than in the other. In FIG. 4, the teeth are slightly more rigid than those seen in FIGS. 3 and 5, so that they can transmit more torque but with less backlash compensation. FIG. 5 is an optimized variant of FIG. 2.

The context described above, in which this backlash-compensating wheel is used, is of course given purely by way of example, and these particular teeth could be used in any other application in which a similar problem arises.

The invention claimed is:

1. A backlash-compensating gear train for a horological mechanism comprising first and second partner toothed wheel units,
   wherein each of said first and second wheel units has uniformly distributed teeth, each of said teeth having a thickness between a first flank of the tooth and a second flank of the tooth,
   wherein at least some of the uniformly distributed teeth of the first wheel unit have elastic parts ($D_R$) that are flexible in the direction of the respective thicknesses of the teeth, the elastic parts being capable of transmitting a nominal drive torque, and
   wherein said teeth having flexible elastic parts include two adjacent teeth capable of transmitting a torque greater than the nominal drive torque,
   wherein the first flank of each of said two adjacent teeth is integral with a more rigid part of the tooth, and the second flank of each of said two adjacent teeth is integral with a more flexible part of the tooth,
   and wherein the two more rigid parts of the two teeth are adjacent to each other, wherein the two first flanks are between the two second flanks.

2. The gear train as claimed in claim 1, in which each of the two more rigid parts has a thickness greater than one half of the thickness of the tooth for at least a part of its height.

3. The gear train as claimed in claim 2, in which side faces of the two adjacent more rigid parts are parallel to a radius of said toothed wheel unit passing through the middle of a space between the two adjacent flanks of these adjacent more rigid parts.

4. The gear train as claimed in claim 3, in which the height of the teeth of the first wheel unit is greater than the height of the teeth of the second wheel unit.

5. The gear train as claimed in claim 2, in which the height of the teeth of the first wheel unit is greater than the height of the teeth of the second wheel unit.

6. The gear train as claimed in claim 1, in which side faces of the two adjacent more rigid parts are parallel to a radius of said first toothed wheel unit passing through the middle of a space between the two adjacent flanks of these adjacent more rigid parts.

7. The gear train as claimed in claim 6, in which the height of the teeth of the first wheel unit is greater than the height of the teeth of the second wheel unit.

8. The gear train as claimed in claim 1, in which the height of the teeth of the first wheel unit is greater than the height of the teeth of the second wheel unit.

9. A horological mechanism including a gear train as claimed in claim 1.

* * * * *